United States Patent [19]

Bures

[11] Patent Number: 4,986,662

[45] Date of Patent: Jan. 22, 1991

[54] TOUCH ENTRY USING DISCRETE REFLECTORS

[75] Inventor: Milan Bures, Tobaccoville, N.C.

[73] Assignee: AMP Incorporated, Harrisburg, Pa.

[21] Appl. No.: 286,560

[22] Filed: Dec. 19, 1988

[51] Int. Cl.⁵ .............................................. G01B 11/03
[52] U.S. Cl. ..................................... 356/375; 250/221
[58] Field of Search ......................... 356/375; 250/221; 340/709

[56] References Cited

U.S. PATENT DOCUMENTS

| | | | |
|---|---|---|---|
| 3,478,220 | 11/1969 | Milroy | 250/221 |
| 4,267,443 | 5/1981 | Carroll et al. | 250/221 |
| 4,305,071 | 12/1981 | Bell et al. | 340/712 |
| 4,310,756 | 1/1982 | Sick et al. | 250/221 |
| 4,346,376 | 8/1982 | Mallos | 340/712 |
| 4,420,261 | 12/1983 | Barlow et al. | 356/375 |
| 4,459,476 | 7/1984 | Weissmueller et al. | 250/221 |
| 4,467,193 | 8/1984 | Carroll | 250/216 |
| 4,673,918 | 6/1987 | Adler et al. | 340/365 P |
| 4,703,316 | 10/1987 | Sherbeck | 250/221 |
| 4,735,477 | 4/1988 | Bowen | 350/96.15 |

FOREIGN PATENT DOCUMENTS

| | | | |
|---|---|---|---|
| 2129666 | 12/1972 | Fed. Rep. of Germany | 250/221 |
| 2131544 | 6/1984 | United Kingdom | 356/375 |
| 2166831 | 5/1986 | United Kingdom | 250/221 |

OTHER PUBLICATIONS

Publication entitled *Laser Touch Entry Device*, by Buhler and Loucks.

*Primary Examiner*—Richard A. Rosenberger
*Attorney, Agent, or Firm*—Robert W. Pitts; Anton P. Ness

[57] ABSTRACT

A system and apparatus utilizes a source of coherent light located at the focal point of reflecting surfaces oriented to develop parallel beams of light extending over a given area with adjacent sides made to include arrays of light detectors scanned sequentially in a direction away from the source of light so as to detect the shadow cast by an object relative to the reflected light. Alternatively, a photodetector is positioned at the focal point of the reflectors to receive light emitted by individual ones of emitters. Reflecting surfaces are contemplated which simulate a parabolic shape.

4 Claims, 7 Drawing Sheets fig. 1

TOUCH ENTRY USING DISCRETE REFLECTORS

FIELD OF THE INVENTION

The present invention relates to the concept of providing a coherent light source lensed to cover an area in conjunction with reflection of light by parabolic reflecting surfaces and detectors arranged to detect the penetration of the area, and in certain embodiments, locate the coordinates of such penetration. The invention in one embodiment utilizes a parabolic reflecting surface and in a further embodiment, simulates a parabolic reflection surface with discrete reflectors. The invention concept has applications of security, safety, and touch entry.

BACKGROUND OF THE INVENTION

Opto-matrix frames have been developed which utilize rows of light sources such as phototransmitters and light detectors such as photoreceptors in X and Y arrays to effectively cover a given area with light beams which, when broken by the insertion of a stylus such as a finger, provide an electronic signal or signals useful to indicate X-Y location of the stylus. Such frames have found widespread use in touch input or touch screen entry devices wherein the frames are fitted over the information display devices of computers and the like. U.S Pat. No. 4,267,443 titled "Photoelectric Input Apparatus" issued May 12, 1981 to Carroll et al. relates to the use of an opto-frame. Large opto-frames have also been conceived for providing security or safety in order to alarm or arrest the movement of machinery so as to prevent entry in unauthorized areas as for example, by the hand of an operator of a punch press relative to the closure of dies in the press.

As a general rule, the cost and complexity of opto-frames has heretofore been proportionate to the number of phototransmitters and photoreceptors employed which number is proportionate to the size of the area to be covered and the resolution desired. As a general rule, the closer together physically the light elements are, the higher the resolution or the ability to distinguish coordinate locations of a stylus or finger or the like penetrating the light beam array. Also as a generalization, the largest part of the cost of opto-frames is for the photoreceptor and phototransmitter devices and associated drive circuits.

With this understanding as background, it is an object of the present invention to reduce the cost of opto-frames by reducing the number of phototransmitters from that heretofore utilized. It is a further object of the invention to reduce the complexity and cost of opto-frames and other area scanning optical systems for detection and coordinate location purposes by substituting reflecting means for numbers of phototransmitters as heretofore employed. It is still a further object of the invention to reduce the numbers of phototransmitters and photoreceptors in applications of light beam area coverage wherein the presence of a stylus or other element breaking such beam must be detected It is a final object to provide a novel technique of reflecting light for a variety of purposes.

SUMMARY OF THE INVENTION

The present invention in one embodiment utilizes a source of expanding light, suitably focused by lensing to provide in effect a sheet of light covering a given area. The source is located at the focal point of a parabolic reflecting surface forming a mirror which reflects such light along parallel lines across such area to be detected by an array of photoreceptors. The invention technique calls for scanning the receptors to sequentially enable them in a direction beginning with a receptor closest to the source of light and thereafter progressively, moving away from said source of light to avoid "false" detections In one specific embodiment, a parabolic reflective surface is employed for each of two intersecting sides of the frame with a source of light located at the focal point opposite of the parabola formed by said reflective surface. In yet another embodiment effectively a half parabola is employed with the source of light located along the edge of the area sought to be covered. In still another embodiment, a parabolic surface is simulated by providing an array of discrete reflective surfaces, each of which are fully analogous to the discrete reflective surface for various points along a parabola.

DETAILED DESCRIPTION OF THE INVENTION

Figure 1:
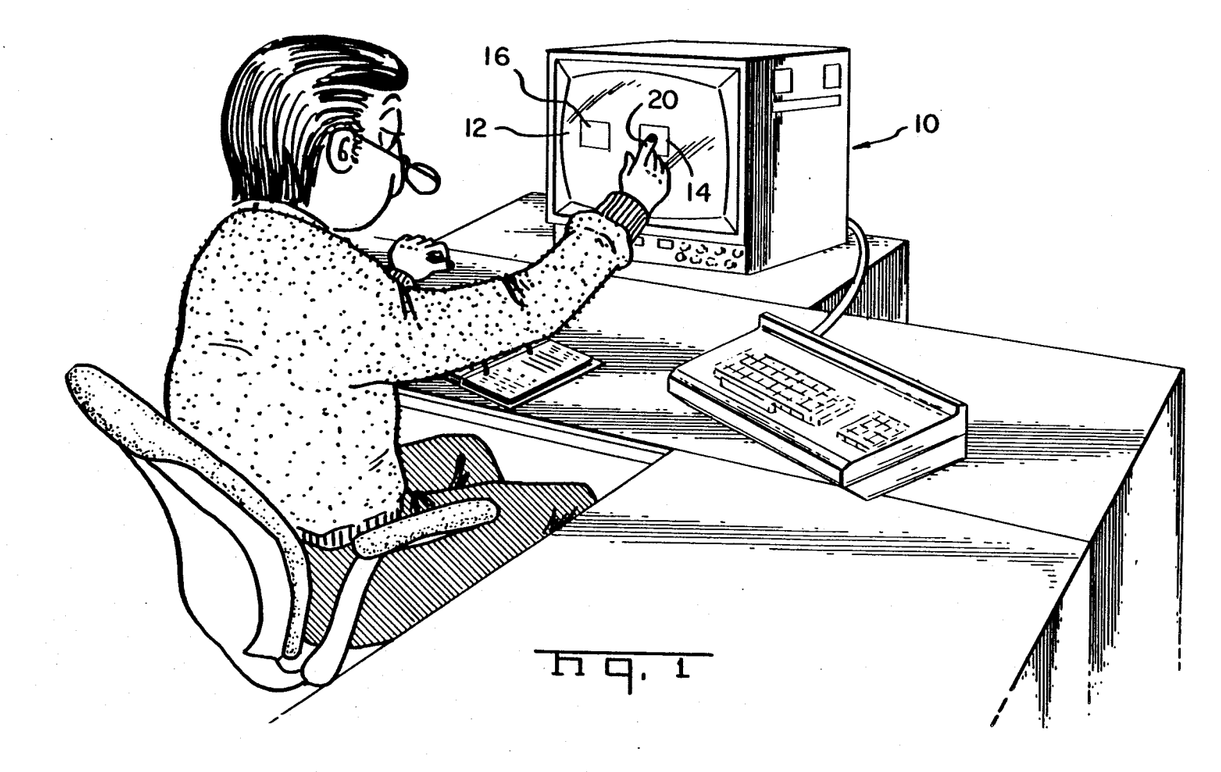
FIG. 1 is a perspective of an opto-frame touch entry device used in conjunction with a CRT.

Referring first to FIG. 1, the element 10 represents a display terminal typical of computers or data entry devices. The terminal 10 includes a display screen 12 which may be a CRT or alternatively, a flat screen display of the electroluminescent, plasma, or LED variety. A stylus shown as 2D in the form of the finger of an operator inserted proximate to the image 14 will interrupt one or more of light beams so that an X position of the stylus relative to coordinates on the screen and a Y coordinate corresponding to image 14 will be detected. The power of touch entry comes from utilizing the identification of a coordinate on the screen to effect some switch function as for example, the menuing of information by display on screen 12 associated with the image 14 in turn identified with the coordinates detected by the insertion of stylus 22 within the light beams covering screen 12. The images shown in FIG. 1 as 14 and 16 and other images which may appear thereon are thus differentiated in position on the screen by virtue of using both the X and Y coordinates which differ as between 14 and 16.

Figure 2:
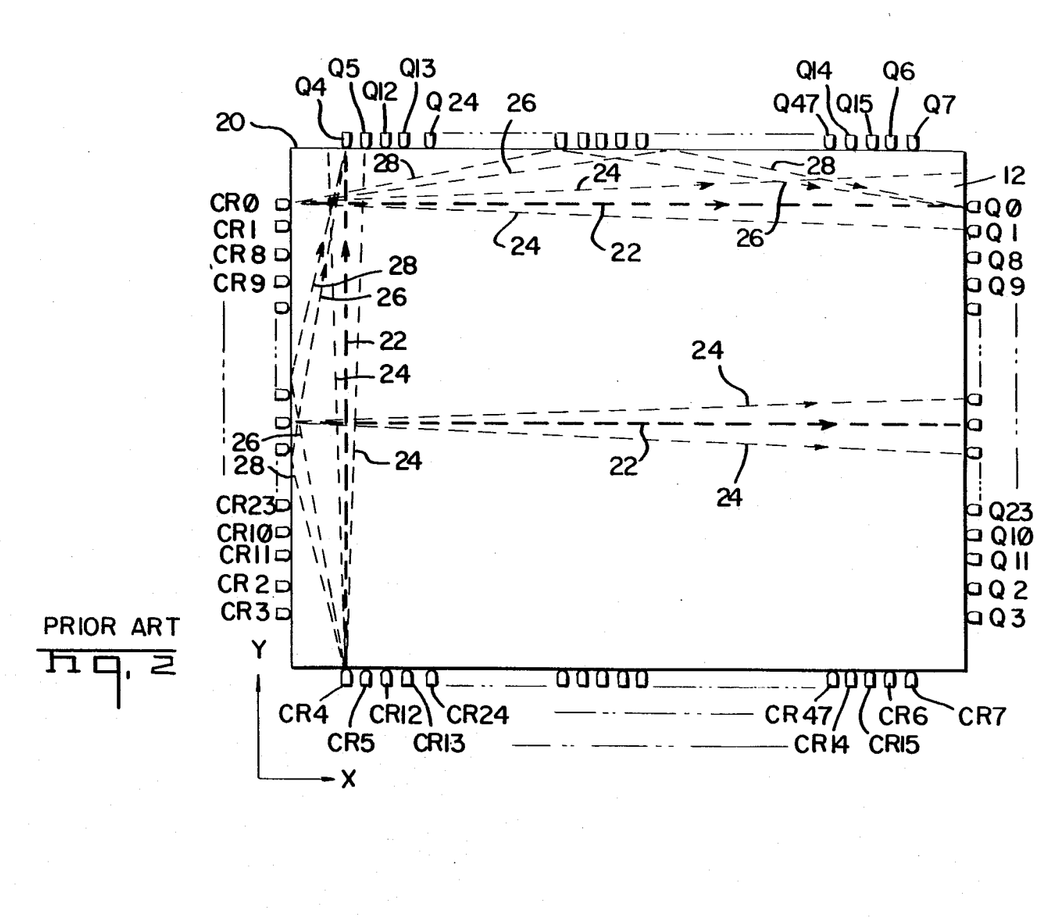
FIG. 2 is a schematic of a Prior Art touch entry device having a plurality of emitters and detectors.

FIG. 2 shows a prior art device in which the X and Y beams are generated by a plurality of individual emitters CRO-CR47. These individual emitters can comprise light emitting diodes which generate individual light beams 22, 24, 26 and 28 in both the X and Y directions. These individual beams are incident upon individual light sensitive detectors Q0–Q47 which can be photodiodes or phototransisters. Various techniques are employed in the prior art for simultaneously sequentially scanning both the emitters and detectors so that each activated detector only receives light emanating from a corresponding emitter.

Touch screens have become a part of data entry with respect to many applications.

In addition to touch entry, the concept of providing an opto-frame for security and/or safety purposes has also been developed. With respect to such applications, an opto-frame placed around an entry way or in front of a dangerous machine can function to set off alarms or disable machine movement precluding injury to an operator. The advantage to such usage over the traditional "electric eye" is that area, rather than merely line, coverage can be achieved.

Figure 3:
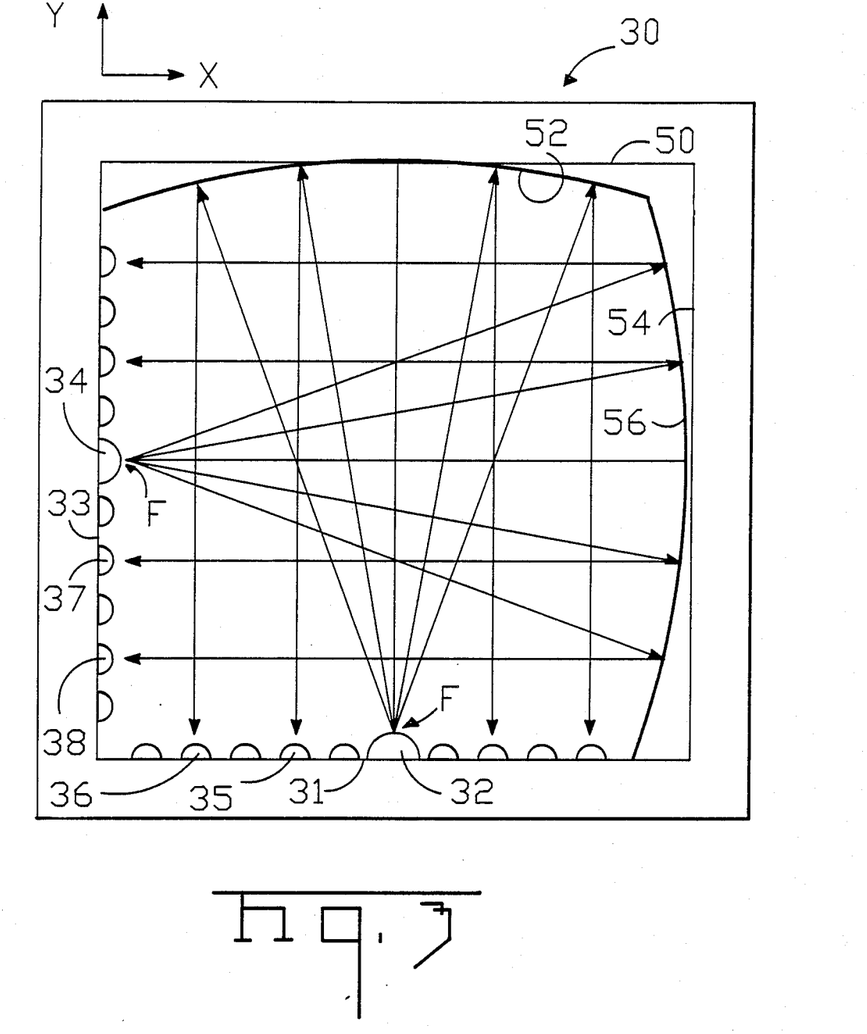
FIG. 3 is a schematic and elevational view of an opto-frame utilizing a parabolic reflecting surface.

Referring now to FIG. 3, an opto-frame 30 is shown which would be fitted over a display screen of FIG. 1. The frame 30 differs with respect to the frame of the prior art in that it includes but a single phototransmitter for each X and Y side of the frame. Thus, the side denominated 31 in FIG. 3 includes a single phototransmitter 32 as does the side 33, phototransmitter 34. As shown in FIG. 3, the phototransmitters 32 and 34 are situated in the middle of the side of the frame. With respect to both sides 31 and 33, there are arrays of photoreceptors, representative ones of which are denominated as 35, 36, 37 and 38. These photoreceptors are placed on centers and thus in number in accordance with the desired resolution of stylus location. Opposite each array of receptors is a parabolic reflecting surface; the frame side 50 including a reflecting surface 52 and the frame side 54 including a surface 56.

The surfaces 52 and 56 may be formed from the metalization of a plastic such as polycarbonate, polystyrene, or acrylon which can be made to have highly polished and reflective qualities. Alternatively, the surfaces 52 and 56 may be made of polished metal tape bonded to a machined or molded surface portion of the elements 50 and 54. In accordance with the invention concept, the surfaces 52 and 54 are given a parabolic shape with the focal point for each of the parabolas being denominated as F in FIG. 3 where it will be observed that the light transmitters 32 and 34 are situated With respect to these transmitters, an appropriate lensing is employed so that when activated, the transmitters provide a sheet of light spreading sufficiently to engage the entire surface of the opposing parabolic reflective surface. Thus with respect to surface 52, the light transmitters and lens structure of 32, 34 is such as to cover the entire surface of the parabola. A readily available transmitter of the appropriate wavelength such as 880 nanometers, in the infrared range, can be obtained through the Siemens Company as their unit SFH409, a gallium aluminum arsenide device. The lensing structure provided with such devices effectively spreads the light so that when the transmitter is energized, light is reflected from the surface such as 52 in the characteristic parallel beams in the manner indicated in FIG. 3 representative of light beams across the entire area bordered by the opto-frame. It is to be noted that the reflected light covers the entire area, whereas the transmitted light covers only a pie slice of such area.

The photoreceptors such as those numbered 35,36 arrayed along the side of the opto-frame will, when activated, receive whatever light is reflected from the surface 52. The photoreceptors or photodiodes are typically gated on sequentially to effectively scan light returning from the pulse generated by the activation of the transmitter 32. Sequential gating of receptors is taught in a prior art patent to Carroll et al. This pulse can be typically 50 microseconds with the pulse rate being 8 to 10 times the scan rate for the photoreceptors. Photoreceptors or phototransistors may be employed, including the Siemens Company elements SFH309.

When a stylus such as 20, as shown in FIG. 1, is inserted in the field of the opto-frame 30, it will interrupt the outward going light beam emanating from transmitter 32 as well as returning light beams emanating therefrom. In accordance with the invention, however, the photoreceptors represented by selected detectors 35, 36 are scanned outwardly and away from the element 32 so that in effect the receptor 35 is gated on first and before the receptor 36. This means that the receptor 35 will detect the lack of light reflection from 52, or the shadow caused by element 20, at a time prior to the detection by receptor 36 of the shadow caused by 20 blocking the outgoing beam from striking surface 52 and being reflected onto 36. In accordance with the invention concept, the outputs of the receptors are supplied as a series of pulses to a circuit which detects the first lack of pulse or shadow as a "hit" and effectively ignores subsequent outputs or lack of outputs from the succeeding receptors. This eliminates false hits. This is done utilizing a counter fed by receptors to be disabled upon a first "hit" or shadow, or lack of pulse. With respect to the showing in FIG. 3, the array of receptors represented by receptors 37 and 38, work in a similar fashion with the receptors being sequentially activated from the center of the frame outwardly.

The combination of transmitter 32 and receptors 35, 36 in conjunction with appropriate circuitry not shown effectively establishes the X position of the stylus 20 with respect to the opto-frame. The receptors such as 37 and 38 shown in FIG. 3, in conjunction with the transmitter numbered 34, work in a similar fashion to establish the Y coordinate of the stylus 20 through reading the reflections of the parabolic surface 56 which is part of the side 54 of the opto-frame. With respect to the circuits utilized to effect transmission and scansion, the circuit is made to detect pulses rather than DC voltages, and with an appropriate adjustment of gain, can discriminate between light sources 32 and 34 and ambient light which may flood the receptors to produce a DC background voltage level.

To place the invention concept shown in FIG. 3 in context for a 19-inch display screen, the focal length F would be on the order of 20 inches with the depth of the surface 52 with respect to a chord through the ends thereof on the order of 2½ inches.

Figure 4:
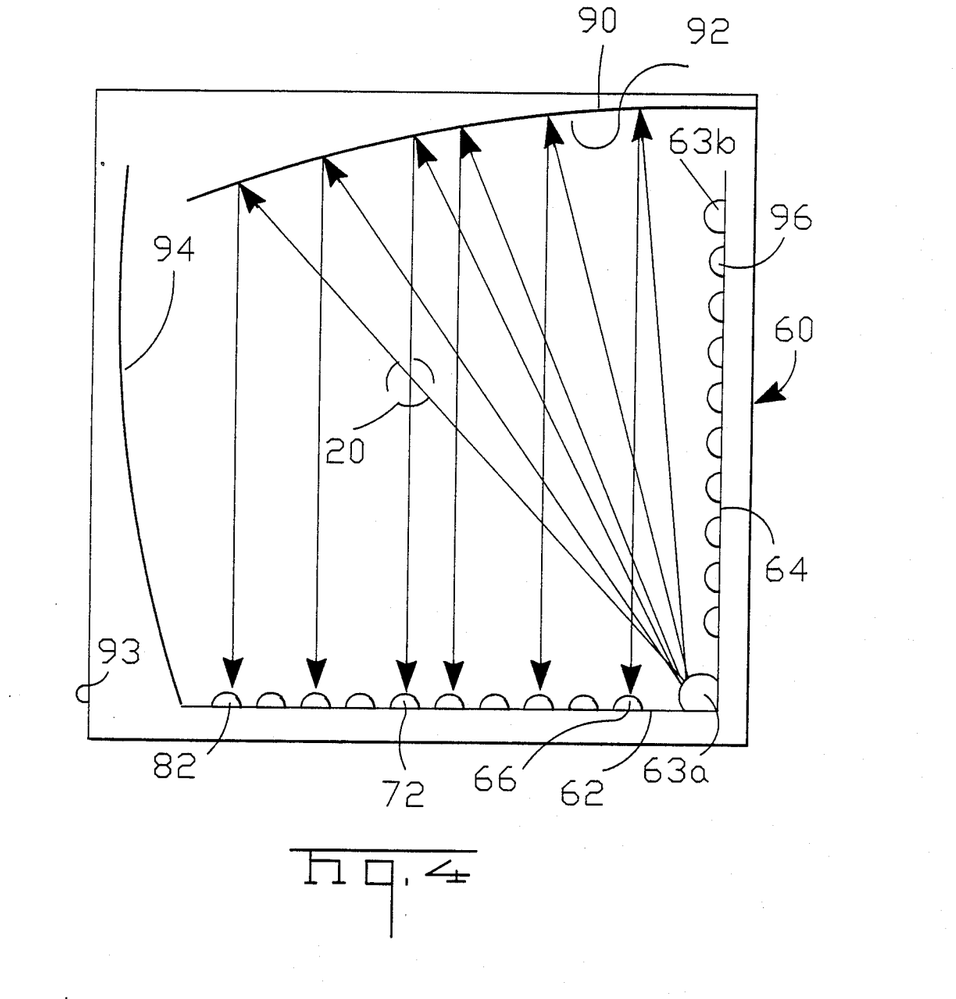
FIG. 4 is a schematic and elevational view of an opto-frame employing a half parabola for a reflecting surface

Referring now to FIG. 4, an alternative embodiment of the invention is shown in the form of an opto-frame 60 which includes sides 62 and 64 each showing at one end thereof a phototransmitter 63a and an array of photoreceptors such as those denominated 66–82 associated with the X side of the opto-frame 60. Opposite to these sides are parabolic structures including that denominated 90 having a surface 92 which is made reflective in the manner heretofore described but is given a shape of a half-parabola as can be discerned in FIG. 4. With respect to the surface 92, the depth thereof with respect to the chord extending between the ends of the parabola of which 92 represents half would be on the order of 1¼ inches for a parabola having a focal length F on the order of 20 inches. There would be a similar structure in the form of a side 93 having a half parabolic reflective surface 94 opposite to the Y side of transmitter 63b and receptors 96 as shown in FIG. 4. In accordance with the concept of the invention, the phototransmitters 63a, 63b are pulsed with a lensed beam of coherent light emanating across the entire area of the frame to be reflected in parallel beams from the surfaces 92 and 94. The area to be covered by the opto-frame is thus covered with a sheet of light emanating from a single lensed transmitter. Circuitry not shown but in accordance with prior art teachings of the effective scanning of receptors causes the receptors to be turned on or activated sequentially from the light source 63a outwardly as from receptor 66 to 82 as previously mentioned. As also discussed, a light beam blocked by a stylus 20 would be detected first by a receptor 72, prior to being detected by receptor 82 and an appropriate circuit would record the X coordinate associated with receptor 72 and ignore subsequent "shadows" or false hits.

The row of receptors associated with the Y axis of the opto-frame 60 would similarly be scanned to detect the coordinate location with respect to Y of the stylus 20.

Figure 5:
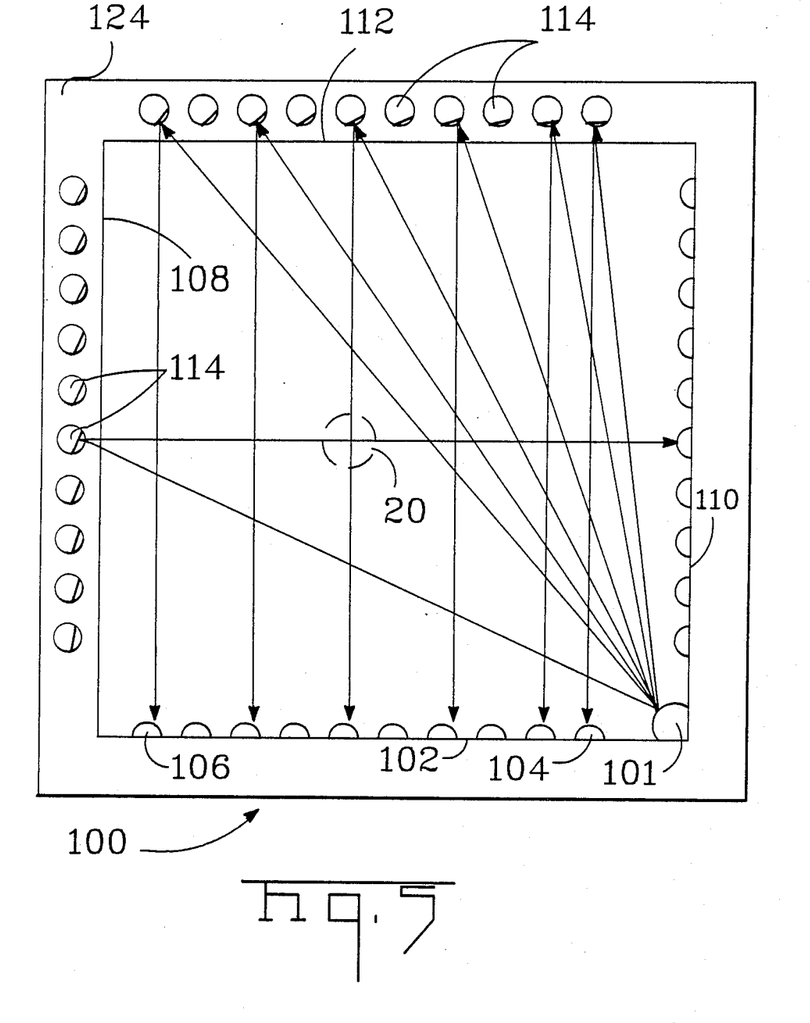
FIG. 5 is a schematic and elevational view showing an opto-frame utilizing simulated parabolic reflecting surfaces
Figure 6:
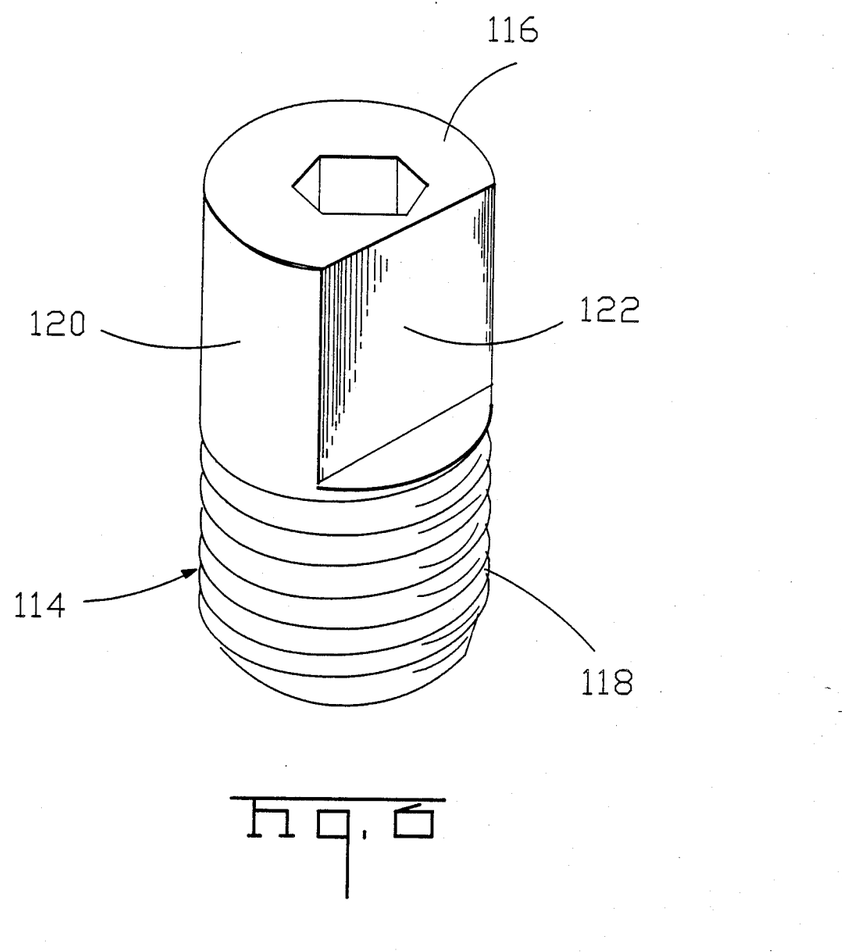
FIG. 6 is a perspective of a simple simulating device.

Referring now to FIG. 5, there is shown an opto-frame 100 which includes an X side 102 having a series of photoreceptors 104 through 106 extending therealong and a further row of receptors extending along the Y side 110 with a phototransmitter 101 at the juncture of the sides 102 and 110 as in the previously described embodiment with respect to opto-frame 60. These elements, transmitter 101 and the various photoreceptors would be activated in a similar manner to effect a scan of the area covered by the opto-frame. With respect to the opto-frame 100, a reflecting structure is provided for the X and Y sides, including a side shown as 108 and a side shown as 112, each including a set of individual reflecting structures such as that shown with respect to side 112. Each of the reflecting structures such as that shown as 114 in FIG. 5 and in perspective, substantially enlarged, in FIG. 6, is made to include a body shown as 116 having at one end a threaded portion 118 and at the other, a procting portion 120 carrying thereon a reflective surface 122. The frame 100 is made to include a body 124 extending along the frame side and tapped and threaded to receive a plurality of elements such as 114 in the manner shown in FIG. 5. The body 124 and the reflective elements 114 may be formed of a plastic material such as lucite as by moulding or machining with the reflective surface 122 of each of the elements 114 appropriately finished for light reflection. Such elements may be made of metal or appropriately metalized in the case of such elements being manufactured of plastic. As with many optical devices, care must be taken in dimensioning and tolerancing the various elements forming the structure of element 112, although an adequate prototype was readily manufactured utilizing standard shop practice but with a polishing of a metallic version of element 114 to a microfinish on the order of 1 micron. The reflective elements 114 are in essence threaded into the body element 124 and rotated to an appropriate angle to simulate the parabolic surfaces heretofore defined. Specifically, each element 114 shown in FIG. 5 is rotated to provide a reflection of light from transmitter 101 along the axis shown in FIG. 5 to receptor element 104. The next adjacent element 114 is rotated to project a reflection of light from element 101 along the axis which intersects the next adjacent receptor element, and so on across the array of elements 114. The precise position for the various elements 114 may be ascertained empirically by measuring the light beam intensity at locations of receptors or may be calculated in accordance with the reflective properties of the paths of the parabola heretofore discussed which the structure of FIG. 5 simulates.

The opto-frame shown in FIG. 5 is particularly useful for experimentation of parabolic simulation, for modeling and for adaptation to screen areas of different sizes when produced in quantities insufficient to amortize tooling for moulding the surfaces 122 in a plastic reflective lens system. That latter approach is preferred when sufficient volume of opto-frames in a given size and with a given focal length are required. There, the body 116 including surfaces such as 122 moulded in and made reflective as by metalization can be readily and economically manufactured from a variety of optical plastic materials such as polycarbonate and acrylon. In a prototype, the area of reflecting surface 122 was on the order of 0.200×0.200 inches which was quite adequate to provide sufficient light in terms of intensity to photoreceptors spaced from such reflection roughly 20 inches away. The opto-frame represented in FIG. 5 thus replicates the function of the opto-frame shown in FIG. 4, but without an actual parabolic reflective surface and represents an improvement thereon for certain applications wherein the overall size of the opto-frame is critical, the added dimension of providing the parabolic surfaces being quite significant.

With respect to the opto-frame 100 of FIG. 5, the Y axis location of coordinates for the positioning of the stylus 20 would be essentially the same as that described for the X axis, utilizing the same light transmitter source 101 with an array of reflective elements 114 on the opposite side. In both instances as in the previous case, the scanning of the receptors would be sequentially scanned in a direction away from the transmitter light source 101.

This would obviate the false hit situation as previously mentioned.

Figure 7:
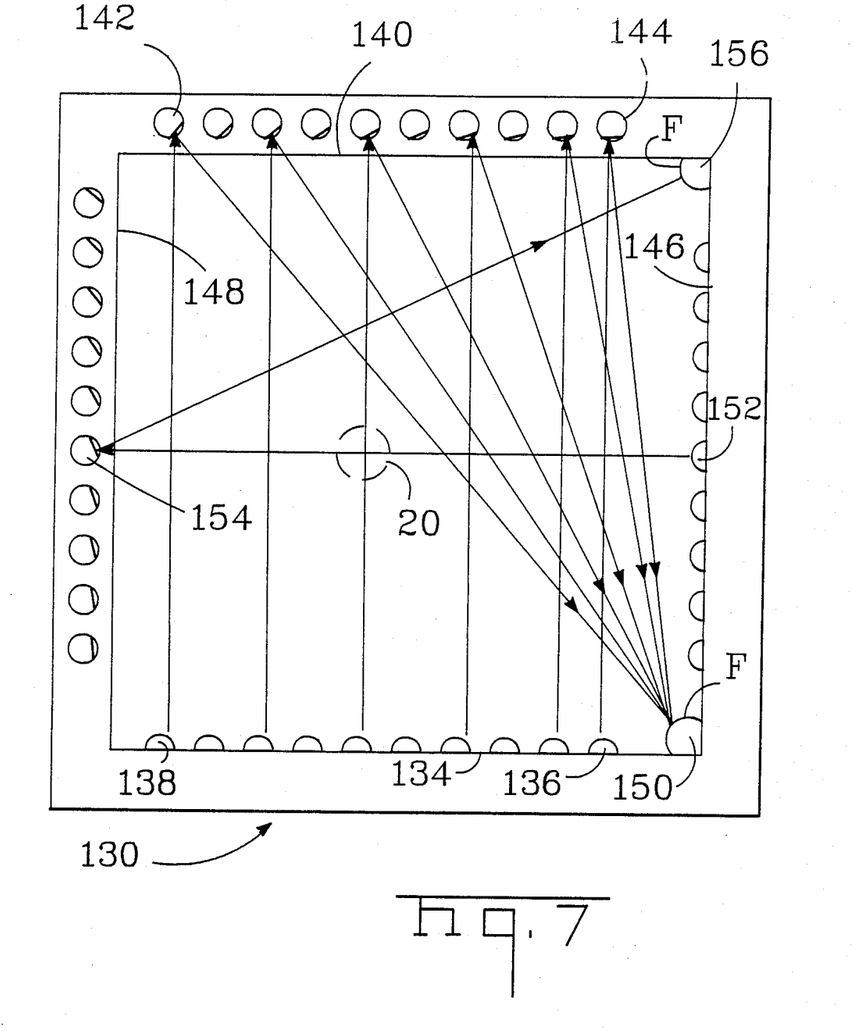
FIG. 7 is a schematic and elevational view of an opto-frame utilizing simulated parabolic reflecting surfaces with each X and Y side having multiple phototransmitters and a single photoreceptor.

In FIG. 7, an opto-frame 130 is shown which includes X sides 134 and 140 and Y sides 146 and 148. The opto-frame 130, however, utilizes multiple phototransmitters and a single photoreceptor for each of the X and Y frame sides. Thus, with respect to the X frame side 134 there are an array of phototransmitters shown as 136 through 138, each of which is sequentially pulsed on to broadcast a beam of light toward the opposite frame side 140, the central orientation of each beam of light being maintained in parallel, it being understood that the light beams from phototransmitters typically have a certain lobe shape in size, breadth, and intensity, dependent upon the characteristics of the phototransmitter and the drive current applied. The frame side 134 further includes a single photoreceptor shown as 150 located at the focal point F of a simulated half parabolic shape reflecting structure including a series of discrete reflecting surfaces 142 through 144 essentially identical in design and function as the discrete reflective surfaces described relative to FIG. 5 and FIG. 6. The reflective surfaces of 142 through 144 are each oriented so as to direct reflected light to the photoreceptor 150. As previously described, the technique of the invention which avoids false hits is based upon energizing the phototransmitter nearest the receptor or focal point F first, followed by sequential energization of the phototransmitters away from F and toward the end of the frame, the last phototransmitter energized being element 138.

Thus, with respect to the frame 130, a beam of light from transmitter 136 focused toward transmitter 144 will produce a reflected beam of light striking 150 unless there is a stylus in the way, blocking what is effectively that channel. As the remaining phototransmitters are sequentially energized, a stream of pulses, time related to the rate of energization, will be produced as an output from 150. If there is no stylus present, there would then be a continuous stream of pulses representing the absence of any stylus in the X sense. The presence of a stylus anywhere in the area of the frame would create a shadow which would provide a lack of pulse in the stream of pulses associating with the location of the phototransmitter in the frame and thus of a coordinate position.

The Y coordinate position would be derived in the same fashion utilizing multiple phototransmitters 152 in the frame side 146 with multiple reflecting surfaces 154 simulating a half parabola located in frame side 148 and with a single photoreceptor 156 located in the juncture of the frame sides 140 and 146 and operable to produce a string of pulses reflecting a Y coordinate position of a stylus 20 inserted into the area of the frame.

In the various embodiments shown, the area of detection has been essentially square. It is to be understood that the invention contemplates a wide variety of shapes or geometries wherein the principles of the invention can be applied. With respect to the simulated parabolic mirror version of the invention, it is contemplated that by an appropriate orientation of the individual mirrors, light reflections can be focused to a desired area or spot for detection rather than being made essentially parallel as in the disclosed embodiment. Also contemplated is the use of holographic techniques to form reflective surfaces as is disclosed in my cofiled U.S. application Ser. No. 07/286,558 filed Dec. 19, 1988.

The principles of the invention as heretofore mentioned may be utilized in applications for safety or security, and it is fully contemplated that the invention be used only to detect the presence or absence of a stylus or other object in which event only one array of receptors need be employed.

Having disclosed the invention in terms intended to enable its practice in several preferred modes, we now set forth what is inventive in the appended claims.

I claim:

1. In a system for locating the coordinates of an object such as a stylus or the like within an area, a frame surrounding and defining said area, said frame including pairs of sides spaced apart with each side of a pair parallel to the other side of said pair to form X and Y sides of said frame, an array of individual reflectors extending in a line along the edge of said area and attached to one side of each said pair of said sides with each said reflector having a reflecting surface oriented to direct light striking said surface in a beam perpendicular to the side of the said frame to which said reflector is attached, a source of coherent light including lens means positioned on a side of said frame opposite to said reflectors and adapted to broadcast light simultaneously to each said reflector on said side opposite from said source of light, an array of light detectors extending in a line along the frame side adjacent to said source of light, means operable to cause said detectors to be sequentially enabled to effect a scan of said area beginning with a said detector closest to the said source of light and extending away from said source of light, and further means operable to stop said scan upon the detection of a shadow as an indication of the location of an object within said area for each said X and Y side of said frame.

2. The system of claim 1 wherein each said reflector includes means for facilitating positioning of the reflective surface thereof to orient said surface relative to said frame to adjust the reflection of said light beam toward a said detector opposite said reflector.

3. In a system for locating the coordinates of an object such as a stylus or the like within an area, a frame surrounding and defining said area, said frame including pairs of sides spaced apart with each side of a pair parallel to the other side of said pair to form X and Y sides of said frame, an array of individual reflectors extending in a line along the edge of said area and attached to one side of said pair of sides with each said reflector having a reflecting surface oriented to direct light striking said surface to a detector at a common point on a side opposite the side containing said reflectors, a plurality of sources of light extending in a line and positioned on a side of said frame opposite to said reflectors and adapted to direct light beams to said reflector opposite thereto, and means to enable said sources of light in a sequence beginning with the source of light closest to the said detector to effect a scan of said area, and further means operable to stop said scan upon the detection of a penetrating said area for each X and Y side of said frame.

4. The system of claim 3 wherein each individual reflector includes means for facilitating positioning of the reflective surface thereof to orient the said surface relative to said frame to adjust the reflection of said light beam toward said detector.

* * * * *